United States Patent [19]
Kline

[11] Patent Number: 5,678,367
[45] Date of Patent: Oct. 21, 1997

[54] FASTENING DEVICE FOR FASTENING SIDING

[76] Inventor: Keith Kline, 16453 Sharp Rd., Rockton, Ill. 61072

[21] Appl. No.: 556,500

[22] Filed: Nov. 13, 1995

[51] Int. Cl.$^6$ ........................................ E06B 1/04
[52] U.S. Cl. ................................. 52/211; 52/658
[58] Field of Search ..................... 52/211, 212, 213, 52/717.01, 718.01, 658, 656.2, 656.5, 656.6, 204.53

[56] References Cited

U.S. PATENT DOCUMENTS

| | | | |
|---|---|---|---|
| 3,139,161 | 6/1964 | Simon | 52/658 |
| 3,287,041 | 11/1966 | Cohen | 52/658 |
| 5,444,954 | 8/1995 | Anderson | 52/211 X |

Primary Examiner—Carl D. Friedman
Assistant Examiner—Creighton Smith
Attorney, Agent, or Firm—David J. Archer

[57] ABSTRACT

A fastening device is disclosed for fastening siding around an opening defined by a building. The device includes a first and a second J-channel element which co-operate together in an abutting connected angular relationship relative to each other adjacent to the opening. The first element has an exposed portion which defines a miter cut disposed adjacent to the second element. The second element has an exposed face, the arrangement being such that in the vicinity of the miter cut, the exposed portion overlies and conceals the exposed face when the elements are disposed in the aforementioned abutting relationship so that when the siding is installed, the exposed portion and the face of the elements appear to be mitered relative to each other.

3 Claims, 10 Drawing Sheets

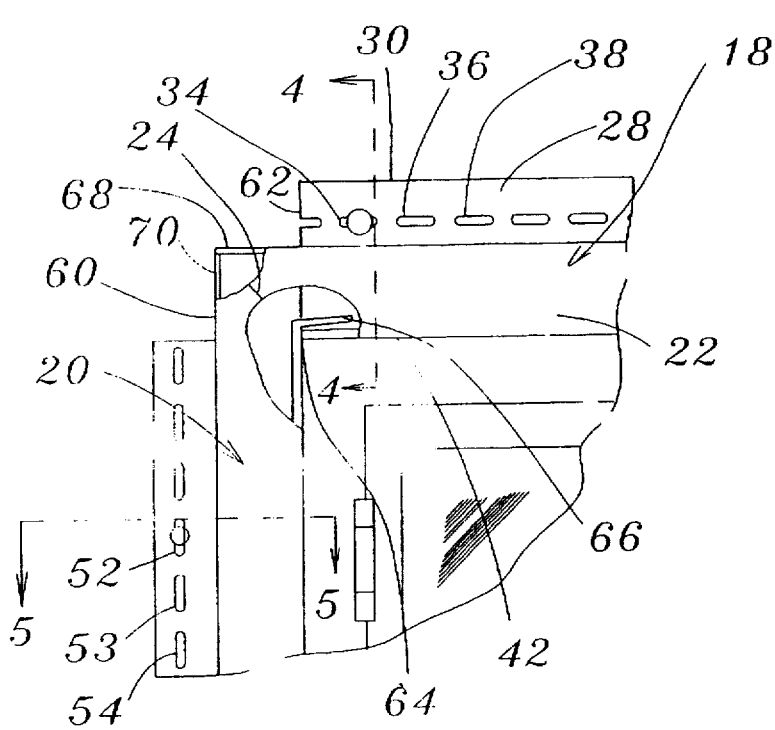
Fig. 3.
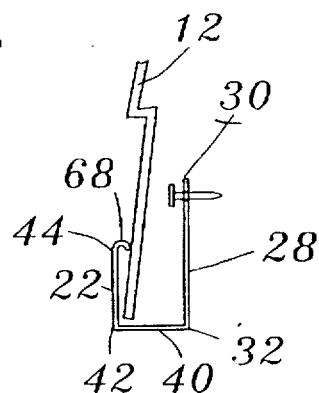
Fig. 4.
Fig. 5.

Fig. 6
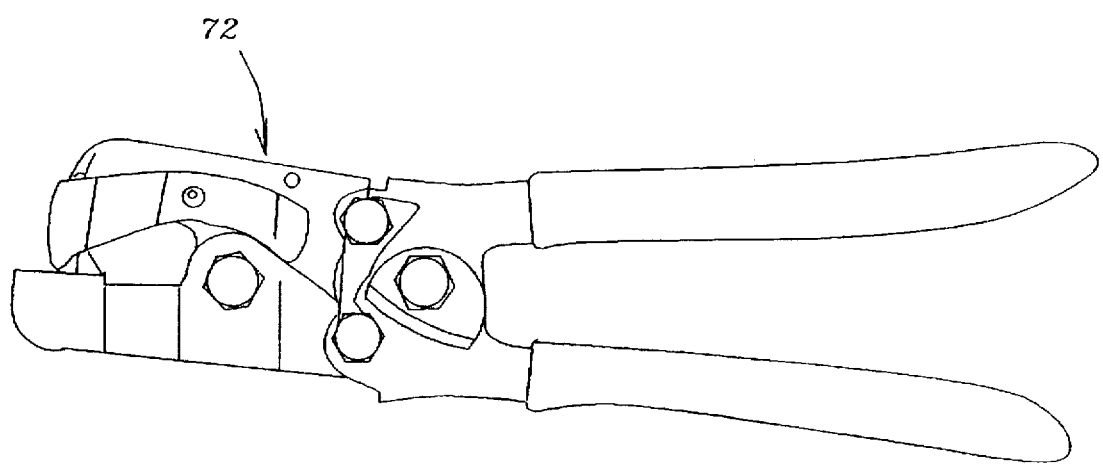
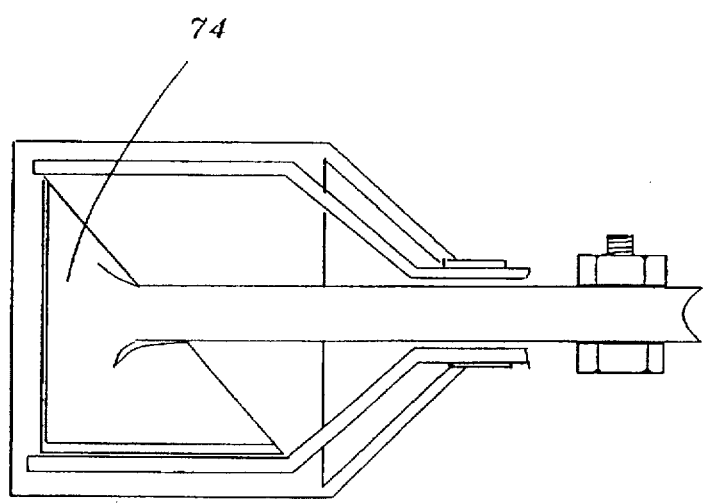
Fig. 7.

FASTENING DEVICE FOR FASTENING SIDING

BACKGROUND OF THE INVENTION

1. Field of the Invention

The present invention relates to a fastening device for fastening siding around an opening defined by a building. More specifically, the present invention relates to a fastening device which includes J-channel elements and a tool for facilitating installation of such J-channel elements and to the cutting of J-channel elements.

2. Information Disclosure Statement

Vinyl siding enables the transformation of a building to present an aesthetic appearance thereto and to protect the building against the elements.

However, although the application of vinyl siding to an unobstructed external wall of a building is relatively straight forward, the application of such siding around windows and doors and the like have proved to be labor intensive thereby increasing the overall cost of the siding operation.

The present invention drastically reduces the time taken to install J-channels around an opening such as a window or the like.

Also, according to the present invention, the co-operating J-channels secured around an opening such as a window present a particularly pleasing appearance when the siding has been locked therein.

Therefore it is a primary objective of the present invention to provide a fastening device for fastening siding around an opening defined by a building such device being secured in considerably less time than the prior art arrangements.

Another object of the present invention is the provision of a fastening device having an improved aesthetic appearance.

Another object of the present invention is the provision of a fastening device having J-channel elements which appear to be mitered relative to each other.

Another object of the present invention is the provision of a punch pliers device for punching a triangular portion from an exposed portion and an exposed face of a J-channel element. The pliers device also permits cutting and preparing the J-channel element so that it fits around the window or the like by cutting a J-channel into at least a first and second element without separating the elements from each other.

Other objects and advantages of the present invention will be readily apparent to those skilled in the art by a consideration of the detailed description contained hereinafter taken in conjunction with the annexed drawings.

SUMMARY OF THE INVENTION

The present invention relates to a fastening device and method for fastening siding around an opening defined by a building. The device includes a first and a second J-channel element which are connected together in an abutting angular relationship to each other adjacent to the opening.

The first element has an exposed portion which defines a miter cut disposed adjacent to the second element.

The second element has an exposed face. The arrangement is such that in the vicinity of the miter cut, the exposed portion overlies and conceals the exposed face when the elements are disposed in the aforementioned connected abutting relationship so that when the siding is installed, the exposed portion and the face of the elements appear to mitered relative to each other.

In a more specific embodiment of the present invention, the first element further includes a base portion having a first and a second edge. The base portion defines a plurality of slots disposed adjacent to the first edge for facilitating fastening of the base portion adjacent to the opening.

A connecting portion extends away from the second edge of the base portion and the exposed portion has a proximal and a distal end. The proximal end is secured to the connecting portion and spaced relative to the base portion. The arrangement is such that the base portion, connecting portion and the exposed portion co-operate together to lockably secure the siding therein.

Furthermore, the second element further includes a further base portion having a first and a second extremity. The further base portion defines a further plurality of slots disposed adjacent to the first extremity for facilitating fastening of the further base portion adjacent to the opening.

A further connecting portion extends away from the second extremity of the further base portion and the exposed face has a further proximal and a further distal end. The further proximal end is secured to the further connecting portion and spaced relative to the further base portion. The arrangement is such that the further base portion, further connecting portion and the exposed face co-operate together to lockably secure the siding therein.

The miter cut extends from the proximal end to the further distal end when the elements are disposed in an abutting relationship.

Additionally, the base portion and the connecting portion define a cutoff portion which extends from a juncture of the miter cut and the proximal end. The cutoff portion extends substantially normal to the connecting portion.

The further connecting portion also includes an extension which co-operates with the juncture of the miter cut and the connecting portion when the elements are disposed in an abutting relationship for locking the elements together.

The distal end defines an inturned lip for lockably securing the siding therein.

Also, the further distal end defines a further inturned lip for lockably securing the siding therein. The arrangement is such that the lip and the further lip co-operate together and are connected to each other such that when the extension is rotated to lie flat against the connecting portion, the elements are locked together.

The present invention also includes a punch pliers device for punching a triangular portion from an exposed portion of a first J-channel element for facilitating the co-operation of the first J-channel element with the second J-channel element disposed in a connected abutting angular relationship relative thereto so that when siding is installed, an exposed portion of the first element and an exposed face of the second element appear to be mitered relative to each other.

The triangular shaped pliers permit cutting of a standard J-channel into at least a first and second element while such elements remain connected to each other.

Many modifications and variations of the present invention will be readily apparent to those skilled in the art by a consideration of the detailed description contained hereinafter taken in conjunction with the annexed drawings. However, such modifications and variations fall within the spirit and scope of the present invention as defined by the appended claims.

Included in such modifications would be the use of the inventive concept of the present invention relative to the installation of a L-channel grid system for supporting a drop ceiling grid work.

The present invention also envisages a pliers tool including both a triangular punch and a rectangular punch so that all the cutting steps can be carried out using one tool.

Also, the tool could include a slide permitting the selective insertion of a punch for punching either a ¾" or a 1" triangular portion according to the type of J-channel used.

BRIEF DESCRIPTION OF THE DRAWINGS

FIG. 3 is an enlarged fragmentary view of the fastening device shown in FIG. 1 with a portion thereof cut away to show how the J-channel elements are connected and locked together;

FIG. 4 is a sectional view taken on the line 4—4 of FIG. 3;

FIG. 5 is a sectional view taken on the line 5—5 of FIG. 3;

FIG. 6 is an elevational view of punch pliers for cutting the J-channel elements according to the present invention;

FIG. 7 is an enlarged view of the punch pliers shown in FIG. 6, showing the triangular punch according to the present invention.

Similar reference characters refer to similar parts throughout the various views of the drawings.

DETAILED DESCRIPTION OF THE DRAWINGS

Figure 1:
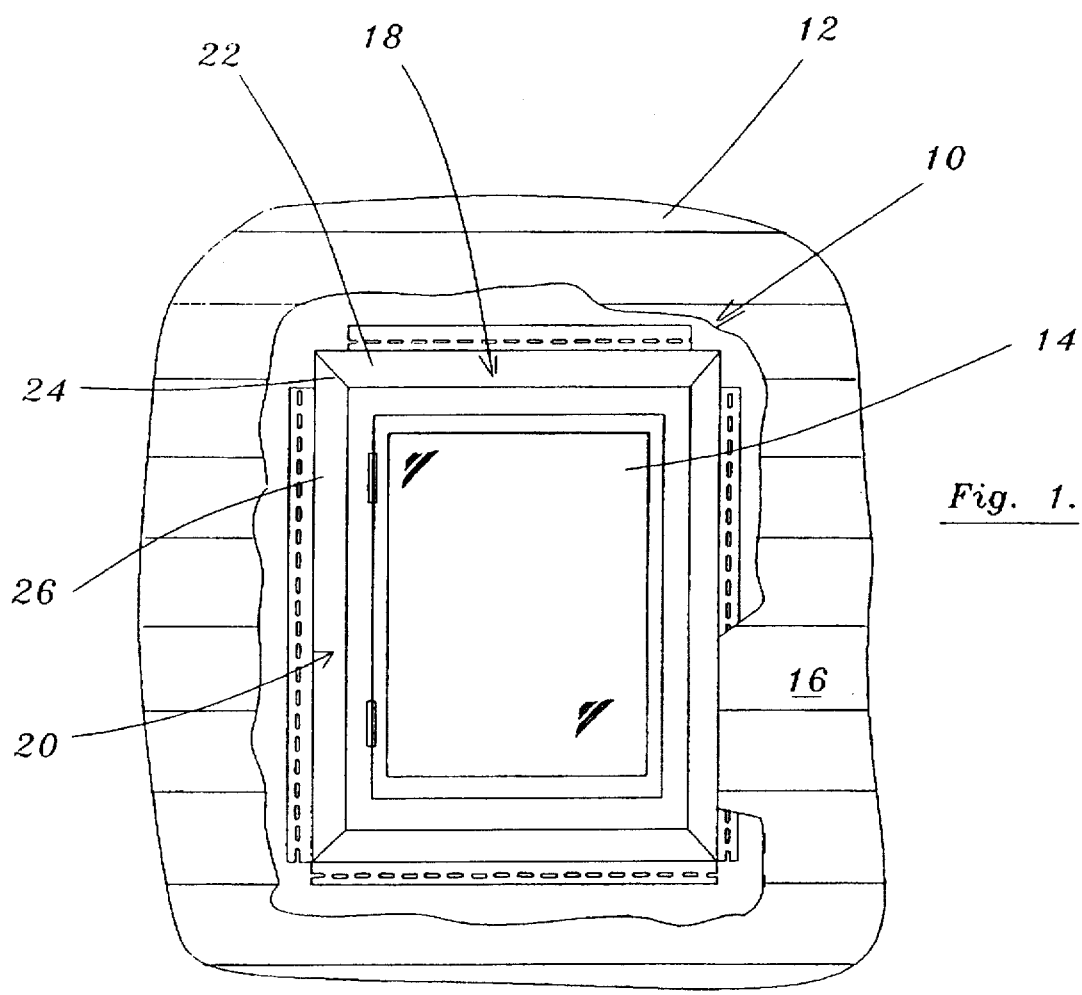
FIG. 1 is a front elevational view partially cut away showing a fastening device for fastening siding around an opening defined by a building according to the present invention.

FIG. 1 is a front elevational view of a fastening device according to the present invention. The fastening device generally designated 10 fastens siding 12 around an opening 14 such as a window defined by a building 16. The device comprises a first and second J-channel element 18 and 20 respectively which co-operate together in a connected abutting angular relationship relative to each other adjacent to the opening 14.

The first element 18 has an exposed portion 22 which defines a miter cut 24 disposed adjacent to the second element 20.

The second element 20 has an exposed face 26. The arrangement is such that in the vicinity of the miter cut 24, the exposed portion 22 overlies and conceals the exposed face 26 when the elements are disposed in an abutting connected relationship as shown in FIG. 1 so that when the siding 12 is installed, the exposed portion 22 and the face 26 of the elements 18 and 20 appear to be mitered relative to each other.

Figure 2:
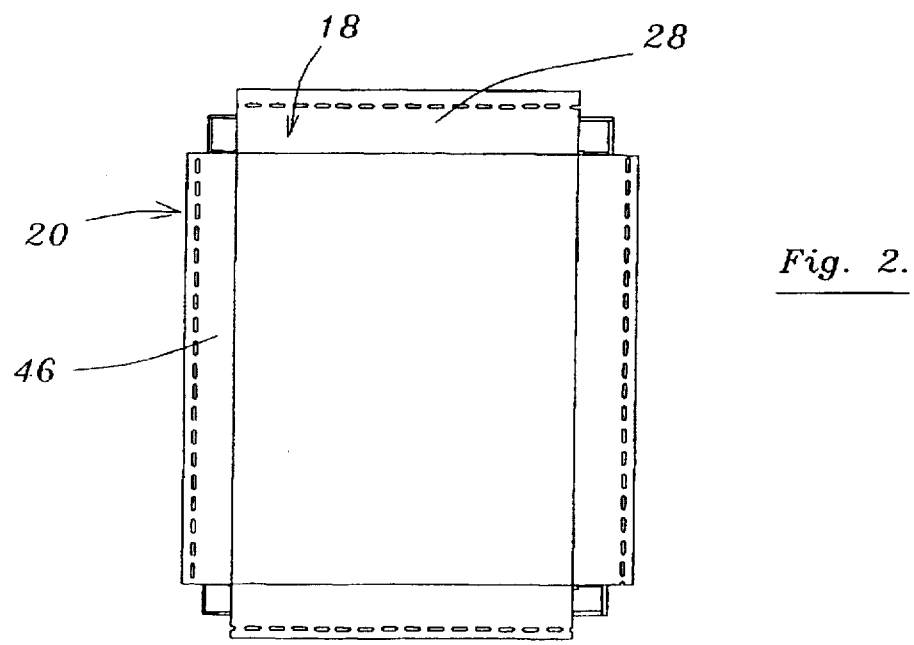
FIG. 2 shows the fastening device of FIG. 1 but viewed from the opposite direction.
Figure 8:
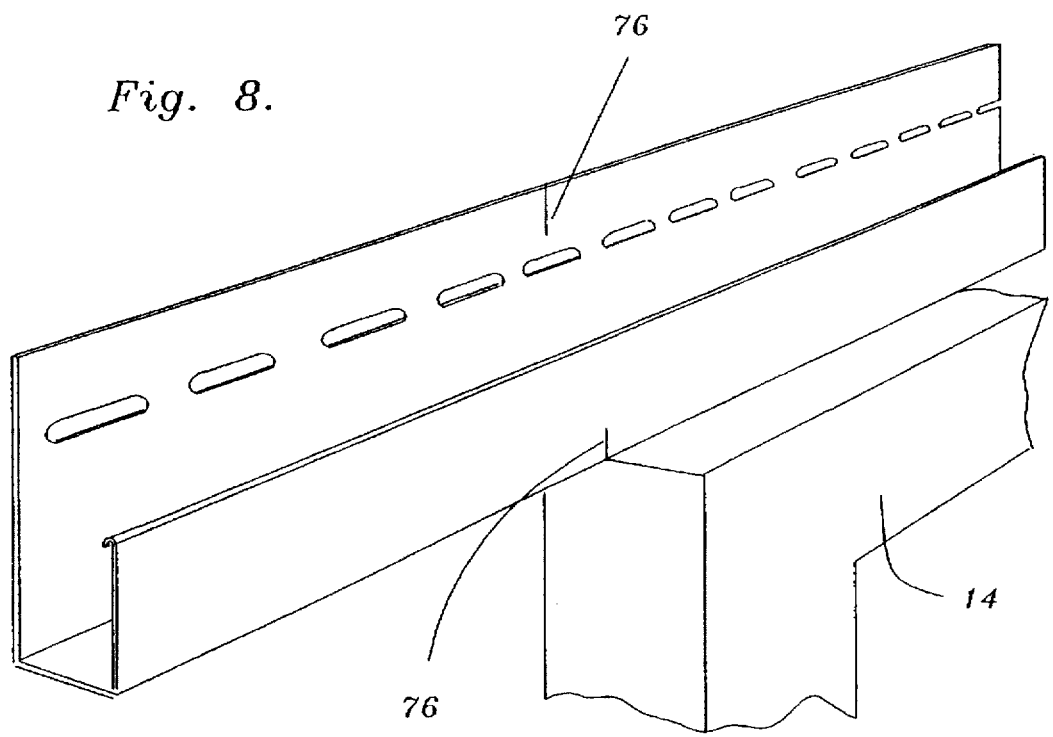
FIGS. 8 to 21 are perspective views of the J-channel element progressively being cut and fitted around a window according to the method of the present invention.

FIG. 2 is a rear view of the fastening device shown in FIG. 1. FIG. 2 shows the first J-channel element 18 having a base portion 28.

Additionally, FIG. 2 shows the second J-channel element 20 as having a further base portion 46.

FIG. 3 is an enlarged fragmentary view of the fastening device 10 shown in FIG. 1 with a portion thereof cut away to show the interrelationship and the means of locking together the connected first and the second J-channel element 18 and 20.

More specifically, the first element 18 further includes the base portion 28 which has a first and a second edge 30 and 32 respectively. The base portion 28 defines a plurality of slots 34, 36, 38 disposed adjacent to the first edge 30 for facilitating fastening of the base portion 28 adjacent to the opening 14. In FIG. 3 the head of a nail is shown extending through the slot 34 for fastening the base portion 28 adjacent to the opening 14.

FIG. 4 is a sectional view taken on the line 4—4 of FIG. 3 and shows the base portion having first and second edges 30 and 32 respectively.

Additionally, a connecting portion 40 extends away from the second edge 32 of the base portion 28.

The exposed portion 22 has a proximal and a distal end 42 and 44 respectively. The proximal end 42 as shown in FIG. 4 is secured to the connecting portion and spaced relative to the base portion 28. The arrangement is such that the base portion 28, connecting portion 40 and the exposed portion 22 co-operate together to lockably secure the siding 12 therein.

FIG. 5 is a sectional view taken on the line 5—5 of FIG. 3.

FIG. 5 shows the second element 20 as further including a further base portion 46 having a first and second extremity 48 and 50 respectively. The further base portion 56 defines a further plurality of slots 52, 53 & 54 as shown in FIG. 3. The slot 52 is shown in FIGS. 3 and 5 with a nail extending therethrough for fastening the base potion 46 adjacent to the opening 14. The slots 52 to 54 are disposed adjacent to the first extremity 48 for facilitating fastening of the further base portion 46 adjacent to the opening 14.

A further connecting portion 56 shown in FIG. 5 extends away from the second extremity 50 of the further base portion 46.

The exposed face 26 includes a further proximal and a further distal end 58 and 60 respectively. The further proximal end 58 is secured to the further connecting portion 56 and spaced relative to the further base portion 46. The arrangement is such that the further base portion 46, further connecting portion 56 and the exposed face 26 co-operate together to lockably secure the siding therein.

In a more specific embodiment of the present invention, and as shown in FIG. 3, the miter cut 24 extends from the proximal end 42 to the further distal end 60 when the elements 18 and 20 are disposed in the aforementioned abutting connected relationship.

Additionally, the base portion 28 and the connecting portion 40 define a cut off portion 62 shown in FIG. 3 which extends from a juncture 64 of the miter cut 24 and the proximal end 32. The cut off portion 62 extends substantially normal to the connecting portion 40.

The further connecting portion 56 further includes an extension 66 shown in FIG. 3 which co-operates with the juncture 64 of the miter cut 24 and the connecting portion 40 when the elements 18 and 20 are disposed in the aforementioned abutting connected relationship as shown in FIG. 3 for locking the elements 18 and 20 together.

Additionally, as shown specifically in FIG. 3, the distal end 44 defines an inturned lip 68 shown clearly in FIG. 4 for lockably securing the siding 12 therein.

The further distal end 60 as particularly shown in FIG. 5 defines a further inturned lip 70 for lockably securing the siding 12 therein.

As shown in FIG. 3, the lip 68 and the further lip 70 co-operate together and are connected to each other such that when the extension or tab 66 is rotated to lie flat against the connecting portion 40, the elements 18 and 20 are locked together.

The present invention also includes a punch pliers device generally designated 72 shown in FIG. 6 for punching a triangular portion from an exposed portion of the first J-channel element 18 and for facilitating the co-operation of the first J-channel element 18 with the second J-channel element 20 disposed in a connected abutting angular relationship relative thereto so that when siding 12 is installed, an exposed portion 22 of the first element 18 and an exposed face 26 of the second element 20 appear to be mitered relative to each other.

FIG. 7 is an enlarged view of the pliers 72 shown in FIG. 6. FIG. 7 shows a triangular punch 74 for cutting a triangular portion from the J-channel elements.

Additionally, in a preferred embodiment and method of installing J-channel elements according to the present invention, a standard 12' 6" length of ¾" J-channel is placed for example above and horizontally flush with a for example a 3' by 2' 6" opening 14 such as a window. The right hand end of the J-channel element is positioned fairly close to the top right hand corner of the window with approximately a ¾" overhang of the window frame. A pencil mark 76 is then made on the J-channel adjacent to the top left hand corner of the window as shown in FIG. 7.

Figure 9:
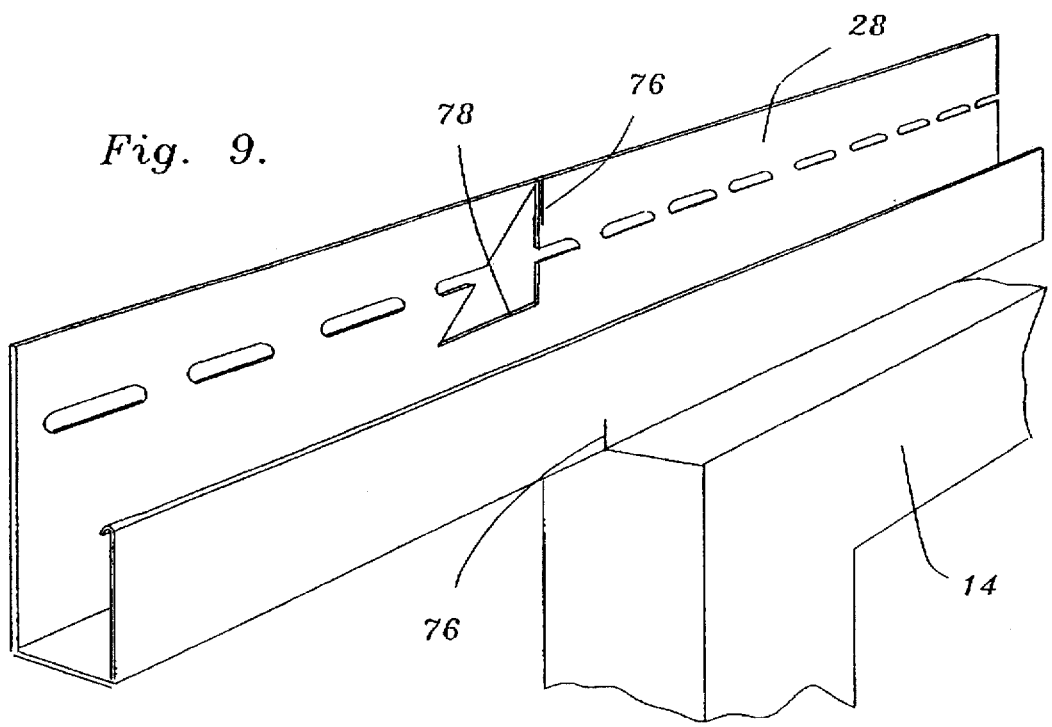
Figure 10:
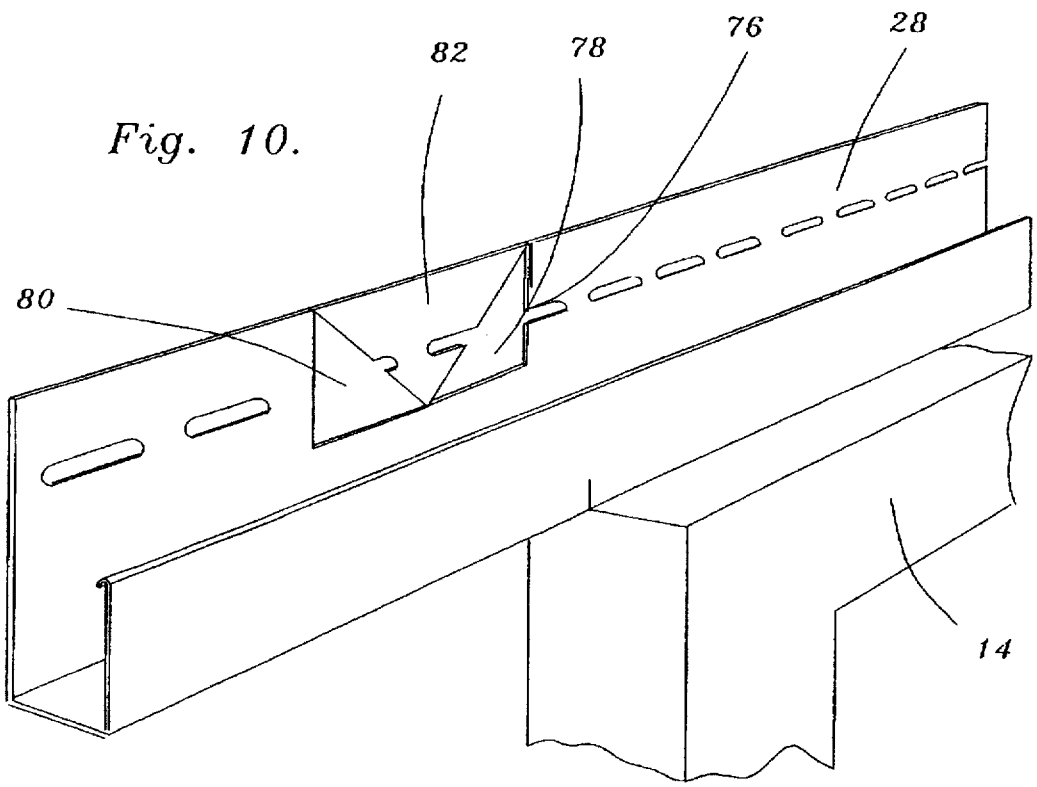
Figure 11:
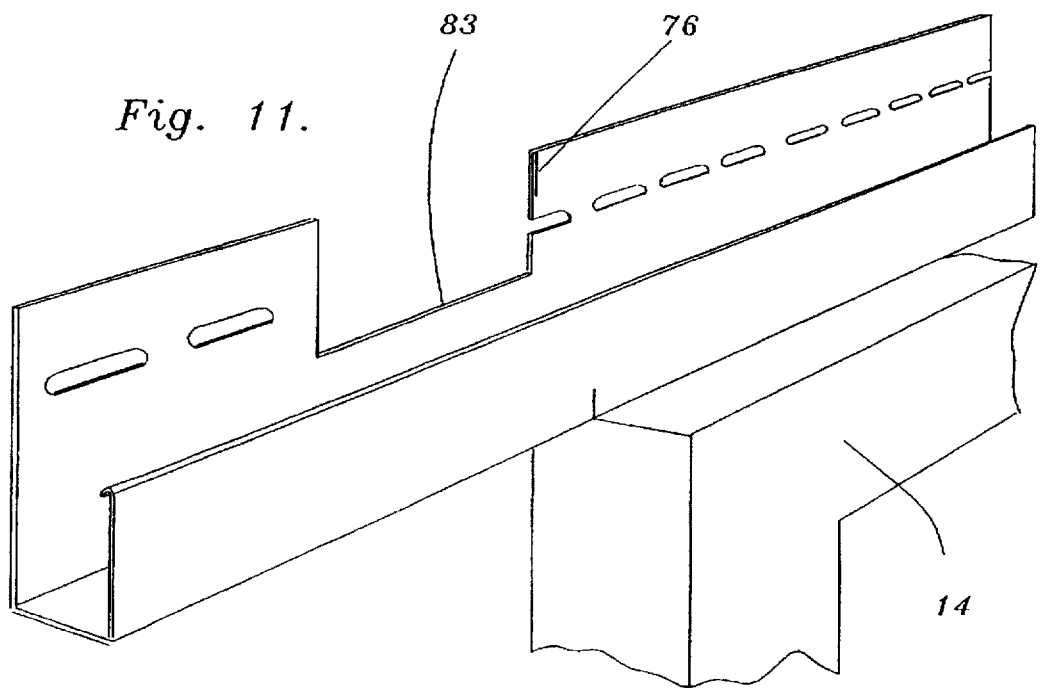

Next, the pliers 72 are used to snip a first triangular portion 78 from the base portion 28 as shown in FIG. 9. A second triangular portion 80 is then cut with pliers 72 as shown in FIG. 10 so that the first and second triangular portions 78 and 80 are adjacent to each other with the first triangular portion 78 aligned with the pencil mark 76 as shown in FIG. 10. As a result of the removal of the first and second triangular portions 78 and 80, a third triangular portion 82 will become detached from the base portion 28 leaving a rectangular void 83 therein approximately ¾" in depth by 1 and ½" in length as shown in FIG. 11.

Figure 12:
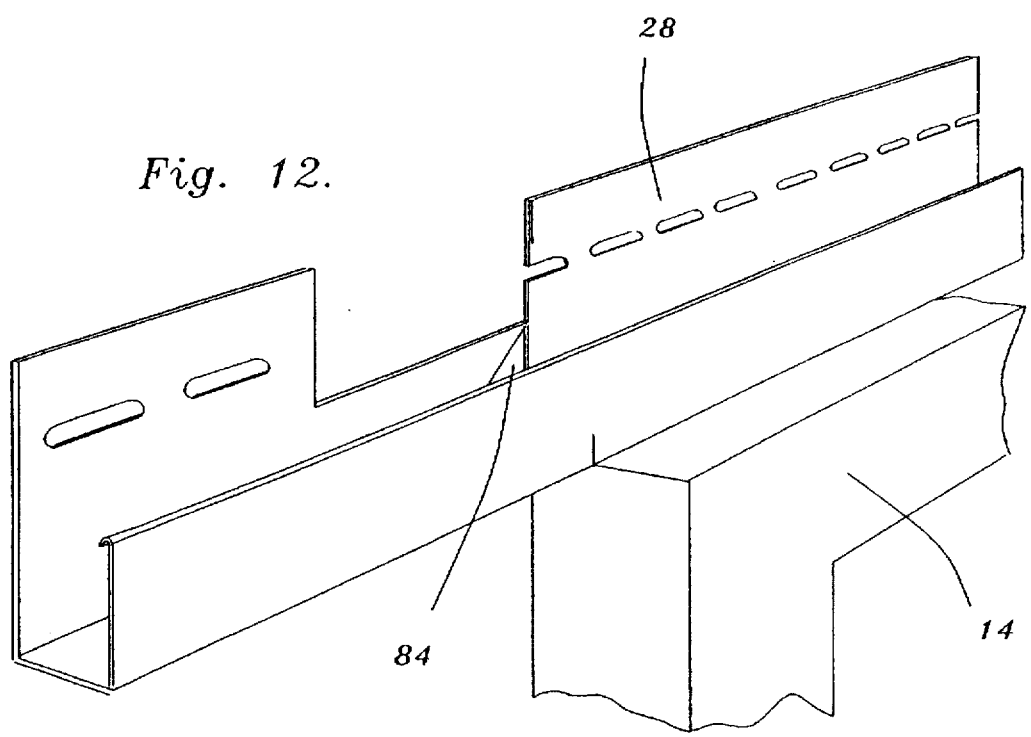
Figure 13:
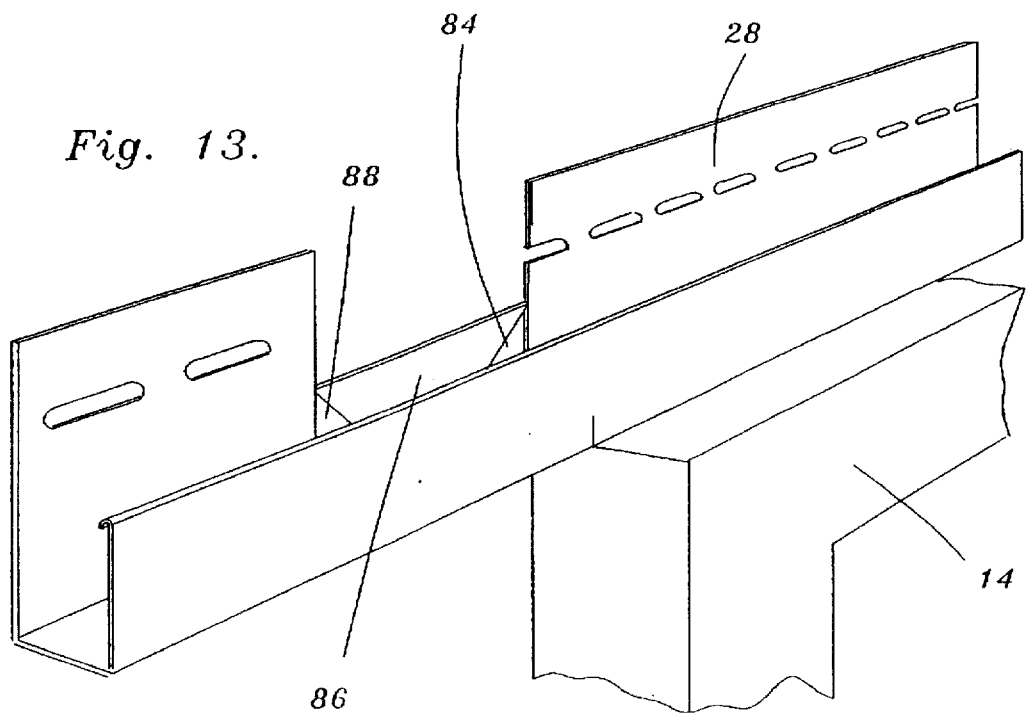
Figure 14:
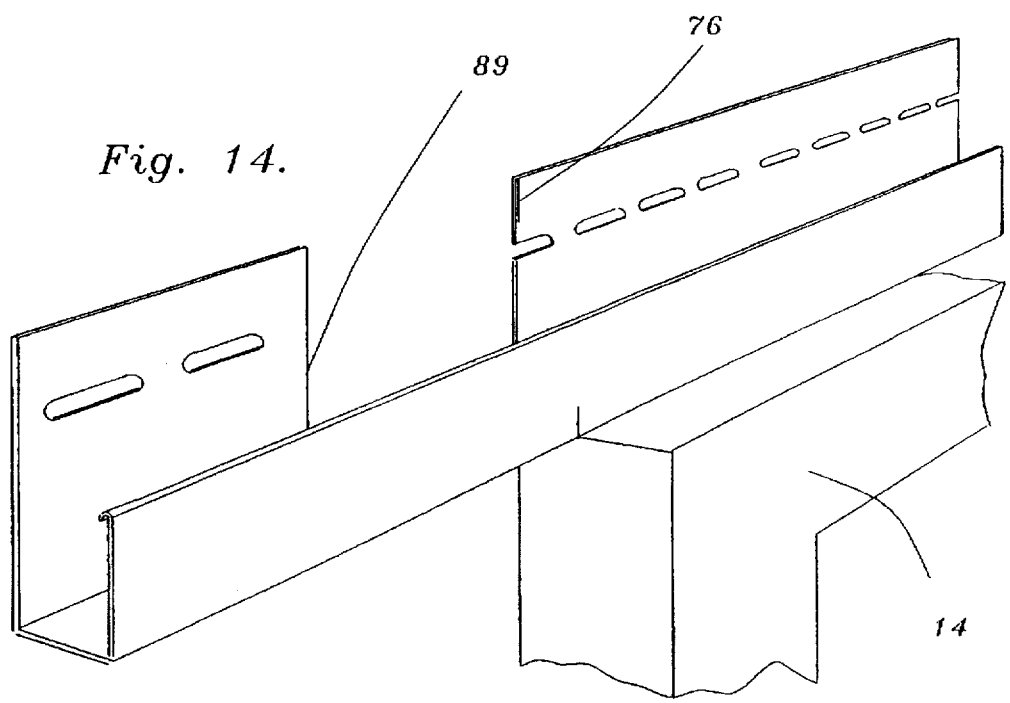

The above steps are repeated so that a fourth, fifth and consequently a sixth portion 84, 86 and 88 respectively are removed from the base portion 28 as shown in FIGS. 12 and 13 thereby resulting in an opening 89 1 and ½" square extending from the pencil line 76 as shown in FIG. 14. Such opening is attained by merely snipping four portions 78, 80, 84 and 86 from the base portion 28.

The above dimensions are given for a ¾" J-channel, that is a J-channel having a distance of ¾" from the base portion 28 to the exposed portion or face 22 and 26 respectively. The base portion has a depth of 1 and ½" and the portion or face 22 and 26 has a depth of ¾". J-channel is also made in 1" sections.

Figure 15:
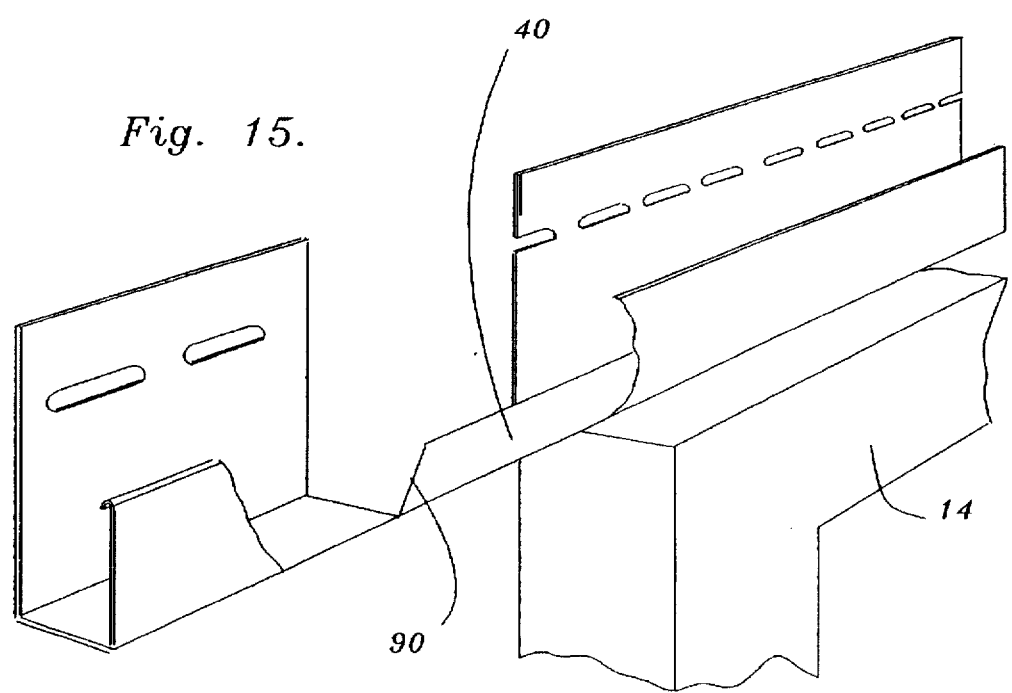
Figure 16:
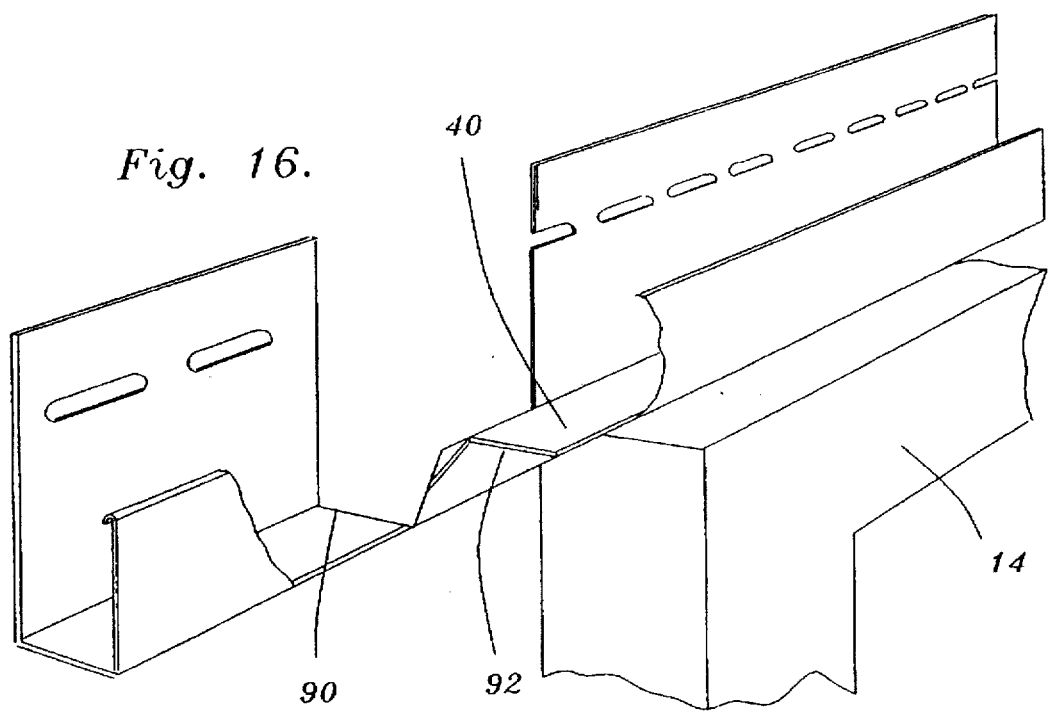
Figure 17:
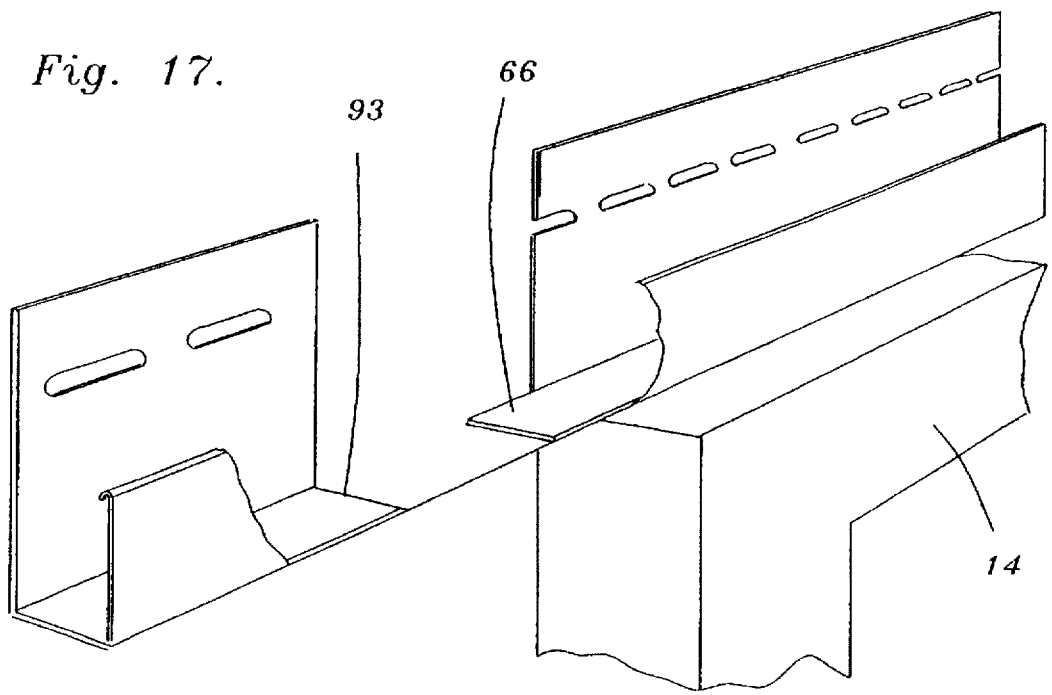
Figure 18:
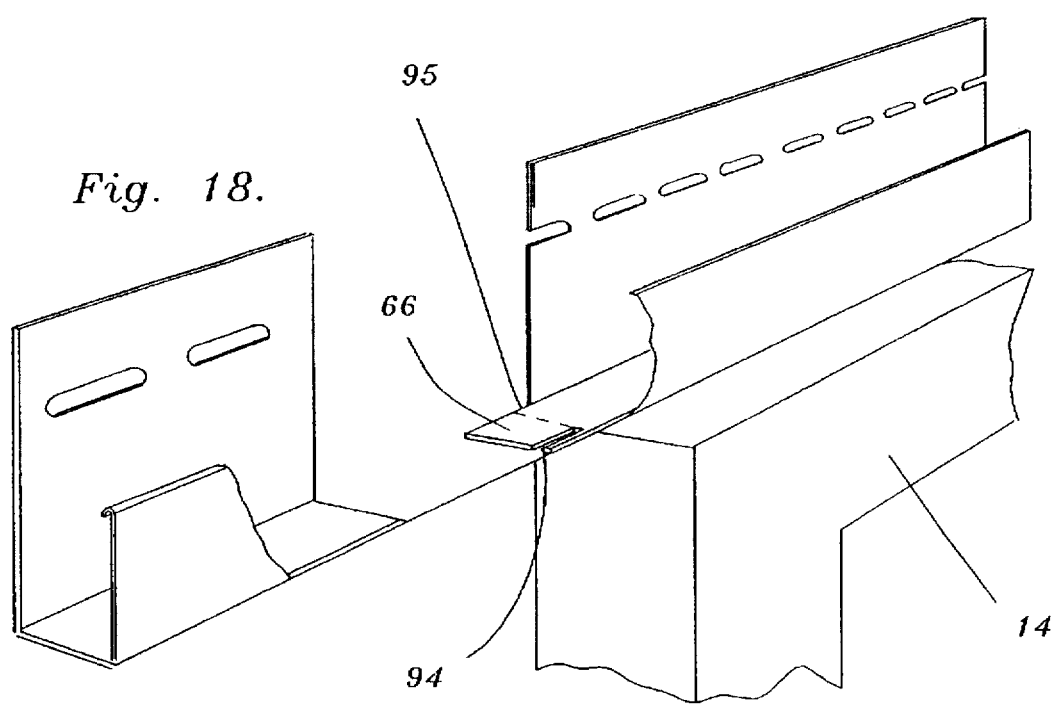

Following the above steps, the pliers 72 are used to remove a seventh triangular portion 90 as shown in FIG. 15 from the connecting portion 40. An eighth portion 92 is then removed from the connecting portion 40 as shown in FIG. 16 to generate a rectangular cut away portion 93 approximately ¾" by 1 and ¼" in length as shown in FIG. 17. This leaves a tab or extension 66 approximately ¾" by ¼" extending from the pencil mark 76 as shown in FIG. 17. A cut 94 is made in the tab 66 as shown in FIG. 18 so that the tab 66 can be bent as shown by dotted line in FIG. 18.

Figure 19:
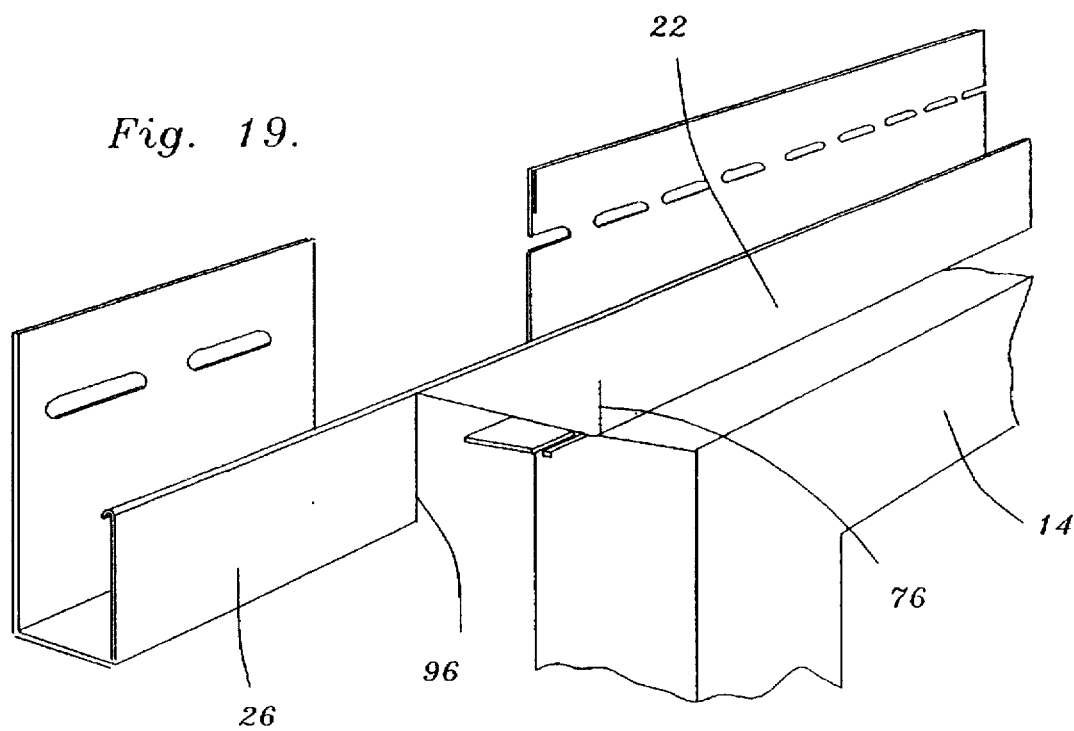
Figure 20:
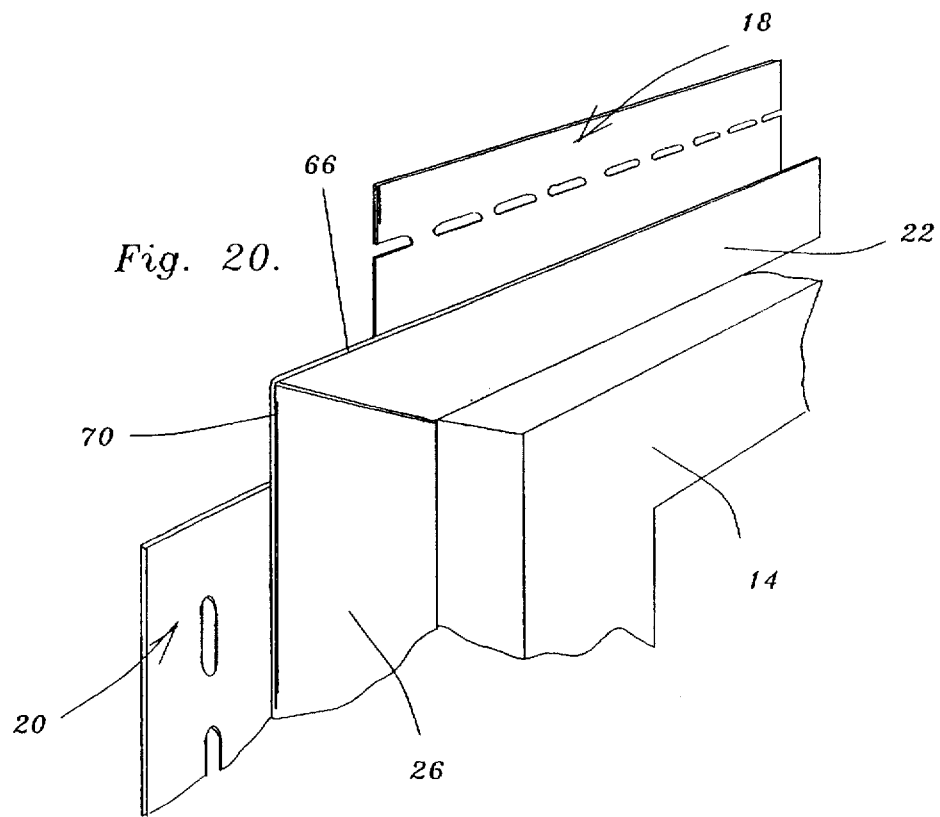
Figure 21:
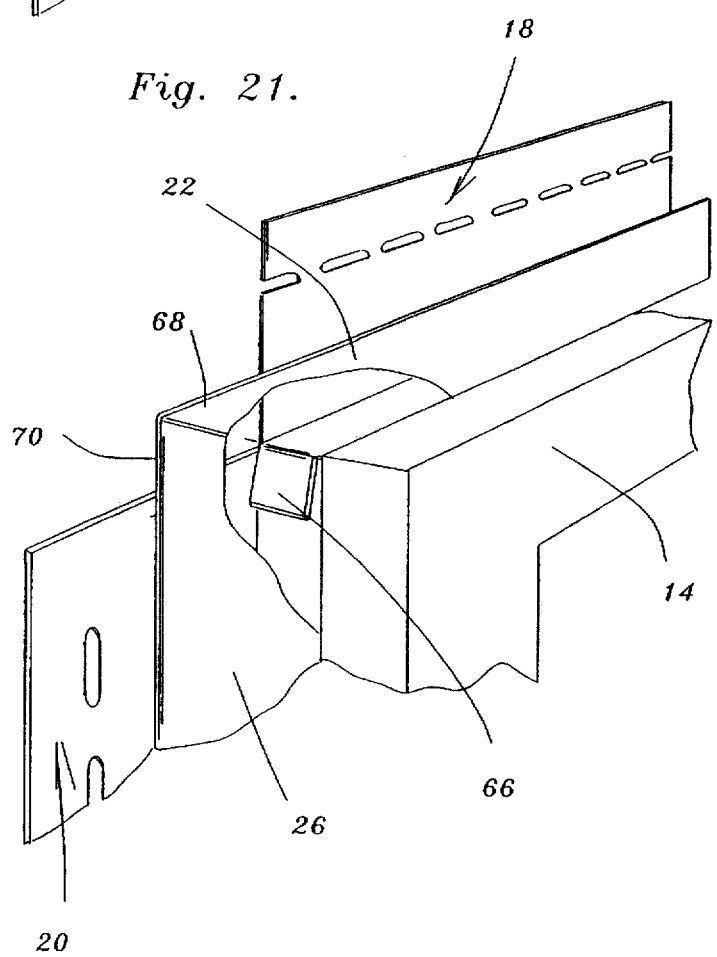

Finally, a ninth triangular portion 96 is cut from the face portion 26 as shown in FIG. 19 with the right side of the ninth portion 96 extending to the pencil mark 76. The portion 96 does not cut through the lip 70 or 68 so the elements remain connected. The first J-channel element 22 that is the right hand length is then positioned against the top of the window frame 14 with the pencil mark 76 against the left hand edge of the window frame 14 and is held in place. The left hand length or second J-channel element 26 is then bent down around the vertical left hand side of the window frame as shown in FIG. 20 while the inturned lips 68 and 70 connect the first and second elements 18 and 20 together. As the elements 18 and 20 extend at 90 degrees relative to each other, the exposed face 26 slides under the exposed portion 22 and the tab or extension 66 is bent downwardly to lock the elements 18 and 20 together as shown in FIG. 21.

A further pencil mark is then made at the corner of the window frame 14 on the second element 20 adjacent to the bottom left end of the frame 14 and the above procedure is followed in order to generate a bottom left hand miter.

When the necessary snips have been made, the second portion 20 may be nailed in position or alternatively, the nailing can be delayed until all four miters joints have been completed.

In the above example, the 12' 6" standard length of J-channel is enough to extend completely around a 3' by 2' 6" window in one piece. More specifically, there will be the top portion starting with a ¾" piece at the right hand top end followed by 2' 6" and then a ¾". Such will be connected to a vertical ¾" plus 3' vertical followed by a ¾". A further bottom horizontal of ¾" plus 2' 6" followed by ¾" and a right hand vertical including ¾" plus 3' plus ¾" making a total of 11' 6" leaving 1' waste.

On the other hand, if a larger window or door is to be surrounded, the 12' 6" length can be cut into the appropriate and most economical lengths so that at least the first and second J-channels are formed from one length connected together.

Also, in order to utilize the J-channels to the maximum, it is also possible to interconnect two elements together by overlapping the same to make an extended length in which the two elements are not disposed angularly relative to each other.

The present invention provides a very efficient means for fastening two J-channel elements together around an opening thereby reducing the installation time and consequently the cost involved in the application of vinyl siding.

Additionally, the present invention provides a fastening device having an enhanced external appearance when siding is lockably secured thereto.

What is claimed is:

1. A fastening device arranged for the purpose of fastening siding around an opening defined by a building, said device comprising:

a first and second J-channel element which co-operate together in an abutting connected angular relationship relative to each other for being positioned adjacent to the opening;

said first element having an exposed portion which defines a miter cut disposed adjacent to said second element;

said second element having an exposed face, such that adjacent to said miter cut, said exposed portion overlies and conceals said exposed face when said elements are disposed in said abutting connected angular relationship so that said exposed portion and said face of said elements appear to be mitered relative to each other;

said first element further including:

a base portion having a first and second edge, said base portion defining a plurality of slots disposed adjacent to said first edge facilitating fastening of said base portion;

a connecting portion extending away from said second edge of said base portion;

said exposed portion having a proximal and a distal end, said proximal end being secured to said connecting portion and spaced relative to said base portion, such that said base portion, said connecting portion and said exposed portion co-operate together for lockably securing the siding therein;

said second element further including:

a further base portion having a first and second extremity, said further base portion defining a further plurality of slots disposed adjacent to said first extremity for facilitating fastening of said further base portion;

a further connecting portion extending away from said second extremity of said further base portion;

said exposed face having a further proximal and a further distal end, said further proximal end being secured to said further connecting portion and spaced relative to said further base portion, such that said further base portion, said further connecting portion and said exposed face co-operate together for lockably securing the siding therein;

said miter cut extending from said proximal end to said further distal end when said elements are disposed in said abutting connected angular relationship; and said base portion and said connecting portion defining a cutoff portion extending from a juncture of said miter cut and said proximal end, said cutoff portion extending substantially normal to said connecting portion.

2. A fastening device as set forth in claim 1 wherein said further connecting portion further includes:

an extension which co-operates with said juncture of said miter cut and said connecting portion when said elements are disposed in said abutting connected angular relationship for locking said elements together.

3. A fastening device as set forth in claim 2 wherein said distal end defines an inturned lip for lockably securing the siding therein;

said further distal end defining a further inturned lip for lockably securing the siding therein;

said lip and said further lip co-operating together and being connected to each other such that when said extension is rotated to lie flat against said connecting portion, said elements are locked together.

\* \* \* \* \*